United States Patent [19]

Masler, III

[11] 4,435,556

[45] Mar. 6, 1984

[54] METHOD OF MAKING AND USING NOVEL SCALE INHIBITING TERPOLYMER

[76] Inventor: William F. Masler, III, 1026 Mattingly Rd., Hinckley, Ohio 44233

[21] Appl. No.: 480,182

[22] Filed: Mar. 28, 1983

[51] Int. Cl.$^3$ .............................................. C08F 20/28
[52] U.S. Cl. .................................... 526/317; 252/175; 524/558; 526/75; 526/240
[58] Field of Search .................... 526/317, 75, 240; 524/558; 252/175

[56] References Cited

U.S. PATENT DOCUMENTS

| | | | |
|---|---|---|---|
| 4,309,329 | 1/1982 | Lucas | 526/240 |
| 4,384,096 | 5/1983 | Sonnabend | 526/317 |
| 4,404,309 | 9/1983 | Masler | 526/75 |

*Primary Examiner*—Paul R. Michl
*Attorney, Agent, or Firm*—Alfred D. Lobo; Alan A. Csontos; Nestor W. Shust

[57] ABSTRACT

A two-step process is disclosed for preparing an essentially non-crosslinked random copolymer of acrylic acid or methacrylic acid with esters of the acids which esters are formed by reaction with an alkylene oxide. Raw materials are (meth)acrylic acid and alkylene oxide. In a first step, a predetermined amount of a particular esterification catalyst is used, and with close control of process conditions, the (meth)acrylic acid yields both mono- and polyalkoxylated esters. In the second step polymerization is effected without separating the esterification catalyst or purifying the esters formed. The resulting random copolymer formed consists essentially of a terpolymer of (i) acrylic acid or methacrylic acid (together "(meth)acrylic"), (ii) a hydroxymonoalkylated (meth)acrylate, and (iii) a hydroxypolyalkyleneoxylated (meth)acrylate the monomeric moieties being present in specified relative proportions. Despite the presence of the polyalkyleneoxylated ester moiety the terpolymer is soluble in water, and is surprisingly effective in the treatment of industrial process water used in recirculating water systems.

13 Claims, No Drawings

METHOD OF MAKING AND USING NOVEL SCALE INHIBITING TERPOLYMER

BACKGROUND OF THE INVENTION

This invention is related to the preparation of a novel scale inhibiting random copolymer useful in the treatment of water in recirculating cooling water systems. More particularly, it is directed to a method for making a terpolymer of acrylic acid or methacrylic acid (hereafter referred to as "(meth)acrylic" acid to denote either acid), and certain esters of the acids which esters are derived by reaction with a lower alkylene oxide under controlled conditions. The terpolymer is substantially the only constituent of an essentially non-crosslinked random copolymer which inhibits the formation and deposition of scale-forming inorganic salts such as calcium phosphate, calcium carbonate and calcium sulfate in open-loop "process water" including cooling water systems, and boiler feed water systems. Such systems are prone to scale-forming precipitation of calcium, magnesium and iron salts, particularly calcuim and magnesium phosphates, under presently preferred alkaline conditions for operating process water systems in industrial applications.

Much interest has been generated by the teachings of U.S. Pat. Nos. 3,663,448; 4,029,577; 4,324,664; 4,324,684; and 4,326,980 directed to the efficacy of various acrylic copolymers in water treatment, the relevant disclosures of which are incorporated by reference thereto as if fully set forth herein. For example, the '577 patent to Godlewski et al discloses that a copolymer of (meth)acrylic acid ("(M)AA" for brevity) or salt thereof, and, a hydroxylated lower alkyl acrylate ("HAA") is highly effective in controlling the formation and deposition of scale and/or suspended solid matter which would otherwise occur in aqueous media containing scale-imparting ions and dispersed particles. The ratio of (M)AA:HAA may be as high as 34:1 and as low as 1:4.

In U.S. Pat. No. 3,663,448 (Ralston), the formation of solid scale-forming salts in aqueous solution is inhibited by adding to the solution small amounts of certain amino phosphonate compounds, together with a water soluble polymer having a molecular weight from about 500 to about 12,000 selected from the group consisting of polyacrylic acid, copolymers of acrylic acid and up to 50% acrylamide and polyacrylamide in which at least 50% of the amide groups are hydrolyzed.

U.S. Pat. No. 4,209,398 (Ii et al.) discloses yet another water treating process wherein a polymer having a structural unit derived from a monomer having an ethylenically unsaturated bond and having one or more COOH radicals, is combined with inorganic phosphates, phosphonic acids, organic phosphonic acid esters, or polyvalent metal salts, to prevent scale formation and corrosion.

The '664 patent to Snyder teaches that the effectiveness of the '577 water-treating composition is enhanced by the addition of a water soluble ester of an aliphatic sulphodicarboxylic acid. The '684 patent to Geiger et al. teaches that a copolymer of the '577 patent may be combined with a water-soluble zinc compound and a water-soluble chromate compound to enhance the corrosion-inhibiting effectiveness of the combination. The '980 patent to Snyder discloses a composition comprising an acrylic acid/lower alkyl hydroxylated acrylate copolymer which is administered to a water system in combination with an alkyl phenoxy polyethoxyethanol compound.

Thus, having found the effectiveness of a copolymer of acrylic acid and an ester of the acid, a great deal of effort has been expended to find increasingly more effective water treatment compositions which retain the effective acid-ester copolymer configuration. This effort continues apace to produce such compositions effectively and economically.

The terpolymer of this invention is particularly useful in cooling water systems including cooling towers, such as referred to in the foregoing prior art patents, in which systems the term "scale" applies to deposits which result from crystallization or precipitation of salts from solution. Scale formation is influenced by the temperature of the water in a particular location, the concentration of the inorganic salts dissolved in that water, the pH of the water, and other factors. It is this scale formation and deposition which is sought to be inhibited.

The current preference for treating cooling water is with a high pH and/or non-chromate corrosion inhibition program which includes phosphates and other salts which lead to the formation of calcium phosphate and other calcium salt deposits. This is equally true of boiler water systems as detailed in the Betz Handbook of Industrial Water Conditioning, 8th Edition, 1980, published by Betz Laboratories, Inc.

It is known that poly[(meth)acrylic acid] and their salts have been treated with alkylene oxides to produce polymeric esters with such catalysts as pyridine or NaOH and the 2-hydroxyalkyl ester has sites for the further reaction of alkylene groups resulting in the formation of grafted polyoxyethylene sidechains on a backbone of poly[(meth)acrylic acid]. (See "Water-Soluble Resins" by Davidson, R. L. and Sittig, Marshall, 2d Edition, pg 165, Reinhold Book Corporation (1968). This confirms the teaching in U.S. Pat. No. 3,116,270 to Pennino that some condensation of alkylene oxide occurs onto the hydroxy ester groups formed on the polymer chain during reaction although the exact structure of the products was not known. However, alkoxylation resulting in polyalkoxy groups on a polymeric backbone is quite different from alkoxylation of a monomer because of the presence of the unsaturation of the monomer. As indicated in U.S. Pat. No. 4,246,370 to Lewis et al., a base catalyzed reaction with an alkylene oxide generating an alkoxide ion would be expected to result in polymerization.

The '270 Pennino patent teaches a cross-linked copolymer formed by hydroxyalkylation ("alkoxylation") of a pre-prepared interpolymer of (i) from 25 to 75% by weight of an alpha, beta-olefinically unsaturated monocarboxylic acid and (ii) from 75 to 25% by weight of an ester of an alpha, beta-olefinically unsaturated monocarboxylic acid copolymerizable with (i). The copolymer is thermosetting only if less than a molar equivalent of alkylene oxide is used relative to each mole of acid in the copolymer. This is necessary to leave carboxyl groups of one chain to crosslink with pendant hydroxyl groups of another chain. Further, his alkoxylated interpolymer has different types of ester substituents on each of the monomer units, and the Pennino process does not suggest that his esterification is substantially affected by either the type or the amount of basic catalyst used, as is the case with the catalyst-sensitive process of my invention.

There is no question that the hydroxyalkyl acrylate can be prepared by the addition reaction between the acrylic acid or its derivatives or water soluble salts, and the oxide of the alkyl derivative desired. For example, the most preferred monomer of the present invention is the propyl derivative. Accordingly, to obtain the hydroxylated monomer ("HAA$_m$"), acrylic acid ("AA") is reacted with propylene oxide (PO) to provide the hydroxypropylacrylate monomer ("HPA$_m$") constituent of the prior art copolymer, but they failed to produce the hydroxypropyleneoxy ester ("HAA$_p$"), or if they did accidentally produce the HAA$_p$, they failed to recognize that they had done so. Under such circumstances it will be appreciated that there could not have been any thought of making the terpolymer of my invention.

Though, given the problem of making the terpolymer of this invention, it is theoretically clear that it can be made, there is no reason for wanting to make such a terpolymer, and no suggestion that if made by the essential manipulative steps of my invention, it would be water-soluble or have a beneficial scale-inhibiting function in recirculating water systems.

Clearly, where a thermosetting water-insoluble polymer with random hydroxyalkyl(meth)acrylate and alkyl(meth)acrylate or other ester units different from the hydroxyalkyl ester units, and, a residual amount of from 5 to 30% free acid is desired, the Pennino process will be used. However, it is not clear whether the "free acid" refers to carboxylic molecules of unreacted monomer, or to COOH groups on reacted monomer units within the polymer. In either case, there is no suggestion that the polymer be modified in any way to be water-soluble, or to contain monomer units having COOH groups in an amount greater than 30% by weight of the polymer. Apparently, because the epoxide constitutes a substantial portion of the polymer and is essential for its cross-linking, the 5–30% free acid provides the desired polymer. Therefore, where a random water-soluble polymer of HAA$_m$ and HAA$_p$ with (M)AA monomer units is desired, it is the process of my invention which will be used.

Of course alkoxylation of (meth)acrylic acid is well known, having been taught in numerous patent references such as U.S. Pat. Nos. 2,484,487; 2,819,296; 3,059,024; and 3,150,167; inter alia, but none was concerned with the subsequent use of the ester formed. Moreover, each used an excess of alkylene oxide in the reaction, whatever the catalyst used, to ensure that all the acid was hydroxyalkylated (or "alkoxylated"), and then, any residual unreacted alkylene oxide was removed to stabilize the esters and minimize the formation of diester during storage (e.g. see U.S. Pat. No. 3,059,024, col 3, lines 10–13).

In addition to Pennino, supra, other patent references which teach carboxyl containing polymers include U.S. Pat. Nos. 2,530,983; 2,607,761; and, 2,908,663, inter alia, but none addresses itself to preparing the copolymer in the presence of an esterification catalyst which is normally reactive with the free radical initiator. Further, one skilled in the art will recognize that the presence of a very small quantity of unreacted alkylene oxide is difficult to avoid in an esterification. If this alkylene oxide is allowed to remain during polymerization, undesirable byproducts would be likely to result and exacerbate the effects of the presence of a hydroxyalkylation-(esterification)catalyst. Therefore, the choice of esterification catalyst, though such catalysts are known in the art, is of critical importance to the manipulative steps of my process.

The choice of esterification catalyst found so effective in my invention is particularly unique because it has long been known that amine catalysts such as pyridine, trimethylbenzyl ammonium chloride, choline, triethyl amine and n-methyl morpholine suffer from several serious disadvantages. For one thing, the reaction using amine catalysts goes slowly and high temperatures are necessary to push the reaction to completion with the result that large amounts of acrylic or methacrylic polymer are built up, as stated in the aforementioned '167 patent to Wright et al. Yet it is essential for the purposes of my invention, that particular amine catalysts be used, and it is fortuitous that these catalysts are free from transition metals, so that my water-treatment composition can be put to general use in process water systems.

From a production point of view, it is undesirable to pre-prepare the alkoxylated acrylate monomer, then purify it before polymerizing it. To avoid purification requires purchasing and handling a monoalkoxylated ester, a polyalkyleneoxylated ester and the (meth)acrylic acid. Moreover the hydroxyalkyl (meth)acrylates are quite toxic and require special handling (see Dow Chemical Co., Material Safety Data Sheet, June 11, 1978). Therefore, aside from the cost of the hydroxyalkyl ester, there is a compelling reason, now recognized because of the commercial importance of the desired hydroxyalkylated acid copolymers, to produce the hydroxyalkyl ester in situ, to avoid purchasing it and to avoid handling the material.

For another thing, one seeking to polymerize particular (meth)acrylate esters with (meth)acrylic acid would routinely be duly careful to purify the monomers prior to purification, thereafter making sure they are introduced in the correct proportions to give the desired polymer. It is simply happenstance that the specific catalysts which are effective in producing the desired mix of HAA$_m$ and HAA$_p$ do not adversely affect the polymerization.

SUMMARY OF THE INVENTION

It has been discovered that a terpolymer of (i) acrylic acid ("AA") or methacrylic acid ("MAA"), (ii) a lower alkyl monoalkoxylated (meth)acrylate ("HAA$_m$"), and (iii) a lower alkyl polyalkoxylated (meth)acrylate ("HAA$_p$") containing plural reacted alkylene oxide groups is highly effective in the suppression or inhibition of the formation and deposition of scale, particularly calcium carbonate, calcium phosphate and calcium sulfate, so that an industrial process water system may be operated efficiently and economically.

A simple, but necessarily controlled, process has been discovered which results in the preparation of a random copolymer which consists essentially of a terpolymer of (meth)acrylic acid and esters of 2-hydroxyalkyl(meth)acrylate, one of which esters has plural reacted alkylene oxide moieties. The terpolymer has the configuration

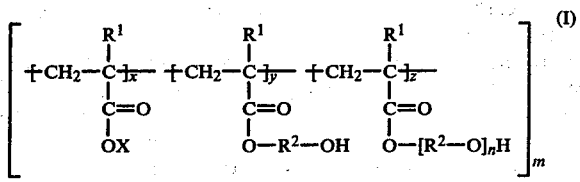

wherein,

X represents H, or NH$_4$, or an alkali metal selected from the group consisting of sodium and potassium;

R$^1$ represents H, or methyl;

R$^2$ represents lower alkyl having from 2 to about 4 carbon atoms;

n is an integer in the range from 2 to about 6;

m is an integer in the range from about 3 to about 180; and, for each y (that is, y=1) x is an integer in the range from about 2 to 5, and z is an integer in the range from 0.02 to about 0.3; and x, y and z are present in relative heterogeneous order.

It has further been discovered that the amount of a specific esterification catalyst used to esterify (M)AA will give a predetermined "mix" of a major proportion by wt of HAA$_m$ and a minor proportion of HAA$_p$ if at least a molar amount, and preferably an excess of (M)AA is present; a desirable mix is easily arrived at, with a little trial and error. Thereafter, polymerization of the mix of esters with a relatively large amount of (M)AA may be carried out in a single reactor ("pot"), without first removing the specified esterification catalyst, or purifying the monomers, if due care is exercised. If limited in the choice of equipment to deal with the heat generated during polymerization, two reactors may be used, the monomers simply being pumped into a solvent held in a second reactor; again, without purifying the monomers or removing the esterification catalyst.

Accordingly, it is also a general object of this invention to provide a two-step process for making water-soluble copolymers for the treatment of industrial process water, starting only with acrylic acid or methacrylic acid, an alkylene oxide, and optionally an appropriate lower alcoholic, or aromatic solvent, selected esterification catalysts, and a free radical initiator for the polymerization reaction which may be effected in an aqueous, alcoholic or aromatic solvent. In the first step, one or more esterification catalysts may be used to provide the desired "mix" of mono- and polyalkoxylated esters. In a second step, polymerization is carried out without removing the esterification catalyst.

DETAILED DESCRIPTION OF PREFERRED EMBODIMENTS

The essential effective ingredient of the water treatment composition of my invention is the terpolymer having the foregoing structure (I) in which there are at least 2 and as many as 5 (M)AA repeating units for each monoalkoxylated ester ("HAA$_m$") repeating unit, and only from 0.02 to about 0.3 repeating units of polyalkoxylated ester ("HAA$_p$") for each HAA$_m$. The terpolymer thus consists essentially of the aforespecified number of repeating units of (M)AA or salts thereof, HAA$_m$, and HAA$_p$.

The esters are prepared in the presence of at least a molar equivalent and preferably an excess of (M)AA relative to the alkylene oxide used, as described in detail hereafter. Though polymerization of the reaction product of the esterification reaction results in a random copolymer, the terpolymer is substantially the only copolymer component of the random copolymer, being present in the range from about 90% to about 99% by wt of the copolymer. Because neither free monomeric or polymeric (M)AA is sufficiently effective in inhibiting scale, it is a further requirement that the random copolymer be substantially free from monomeric (meth)acrylic acid or poly[(meth)acrylic acid].

It is also a requirement that the composition be soluble in water. Though the composition is used in low concentrations in the range from about 1 to about 50 parts per million (ppm) in water to be treated, the solubility of the composition is at least 20 parts by wt per 100 parts by wt of water. Typically, the composition is used in water in the range from about 2 to about 20 ppm, though in some extreme cases as much as 200 ppm may be used. Thus, high solubility of water treatment compositions is not essential but desirable. The product is preferably shipped in drums as a concentrated aqueous solution containing in the range from about 20% to about 50% by wt of solids per 100 parts of solution. As the proportion of (mono-) HAA$_m$ and (poly)alkoxylated ester HAA$_p$ in the copolymer increases, its solubility decreases, and this limits the ratio of alkoxylated repeating units to non-alkoxylated units in the terpolymer. It is most preferred to have x in the range from about 2 to 5, and z in the range from about 0.02 to about 0.3 where y=1.

The preferred process embodied in this invention utilizes (M)AA which may be esterified and subsequently polymerized under controlled conditions in a one-pot reaction. Esterification of the aforementioned acids is effected by reaction of an excess of acid with a lower alkylene oxide having from 2 to about 6 carbon atoms, most preferably one selected from the group consisting of ethylene oxide, propylene oxide and butylene oxide, in the presence of selected hydroxyalkylation catalysts. These catalysts are selected from the group consisting of pyridine, tetramethylammonium chloride, trimethylbenzyl ammonium chloride and 2,6-lutidine. Most preferred is propylene oxide catalyzed with pyridine or a mixture of pyridine and 2,6-lutidine.

The effectiveness of the water treatment composition is attributable to the critical presence of the HAA$_p$ in the amounts stated. Too large a proportion of HAA$_p$ adversely affects the performance of the composition. It has been found that the amount of the chosen esterification catalyst used determines the rate at which the mix of HAA$_m$ and HAA$_p$ is formed. In general, the larger the amount of catalyst the more the HAA$_p$ formed, and some catalysts are more prone to form HAA$_p$ than others at the same concentration. The mix of esters obtained determines the composition of the terpolymer to be formed. Therefore, it is expedient to determine a desirable ester mix for the water treatment composition to be made, by simple trial and error. The amount of catalyst found effective is generally in the range from about 0.5 to about 2% by wt of the (M)AA to be esterified. It is sometimes convenient to use a mixture of esterification catalysts, the 2,6-lutidine favoring formation of the hydroxypolyalkyleneoxylated ester ("HPA$_p$").

The temperature of esterification is preferably in the range from about 70° C. to about 150° C. depending upon the temperature tolerance of the reaction as evidenced by the extent of (M)AA dimerized, or other unwanted byproducts formed with the alkylene oxide used. It is found that the preferred temperature for any particular "mix" of esters desired for subsequent polymerization is relatively narrow, otherwise unwanted byproducts are formed which will either interfere with the course of the subsequent polymerization reation, or will produce an undesirable polymer.

The pressure during esterification will be superatmospheric since the alkylene oxide is refluxed to control the heat transfer during the reaction if the rate at which the alkylene oxide is formed is sufficiently high. It is preferred to carry out the reaction under autogenous pressure at reflux conditions of the alkylene oxide in an inert atmosphere. Progress of the esterification reaction may be monitored by gas chromatography using an internal standard such as 1,2-dimethoxyethane (DMOE) and further adjustments to the reaction by addition of catalyst, or addition of alkylene oxide or (M)AA may be made.

After the esterification reaction is deemed complete the esterification catalyst may be neutralized if desired, and if it is neutralized, the products of neutralization are not removed from the reactor.

The essential manipulative steps of the invention which are so surprisingly effective are (i) esterification to produce the $HAA_p$ in addition to the $HAA_m$ despite the presence of the slight excess of (M)AA, and (ii) polymerizing the carboxylic acid and the alkoxylated esters thereof in the presence of the esterification catalyst. Though a small amount of $HAA_p$ is formed during the esterification step if only a stoiciometrically molar amount of (M)AA required to form only $HAA_m$ is present, such stoichiometric amount is not preferred. An additional benefit of the process of this invention is that it may be carried out in a single properly equipped reactor, avoiding transfer and handling of materials which results in economy, safety and convenience (hence referred to as "one pot, two step"), all without introducing interfering reactions deleterious to the formation of the copolymer desired.

Since esterification is carried out in the presence of a slight molar excess of from about 5% to about 25% of (meth)acrylic acid, some acid remains in the reaction product. If upon analysis, this amount of acid is insufficient to give the desired mix of esters, additional acid may be added. It will be apparent if the excess of acid is greater than 25%, the formation of the $HAA_p$ will be retarded even with a catalyst which favors its formation.

Subsequent polymerization of the (M)AA and esters thereof is effected, in a mutual solvent for them, preferably a lower alkanol having from 1 to about 6 carbon atoms, without purification of the esterified (M)AA, with an effective amount of a free radical initiator sufficient to overcome the inhibition effects of any inhibitors which may be present in the esterification reaction product, and to effect copolymerization. Prior to polymerization, sufficient additional (M)AA will be added to yield a terpolymer with the desired ratio of x:y:z.

Typically, from about 0.2 to about 3 parts by weight of initiator per 100 parts of (M)AA monomer are used, preferred initiators being acetyl benzoyl peroxide, peracetic acid, hydroxyheptyl peroxide, isopropyl peroxydicarbonate, methyl ethyl ketone peroxide, cyclohexane peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, caprylyl peroxide, methyl cyclohexyl hydroperoxide, t-butyl permaleic acid, t-butyl perbenzoate, di-t-butyl diperphthalate, azobis-isobutyronitrile, the so-called redox and heavy metal polymerization initiators and the like, and others. The copolymer is usually formed in high conversion, usually in excess of 90% conversion and often as high as 95 to 100%.

The copolymer formed is converted from the alcohol solution to a water solution. Typically, the alcohol is stripped from the solution with steam, or distilled off with subsequent additions of water and repetition of distillation to remove the alcohol, followed by the addition of water and a neutralizing agent such as caustic solution, ammonia, a hydrazine or a low-boiling primary, secondary or tertiary aliphatic amine. Though polymerization is preferably carried out with a lower alkanol solvent under reflux conditions to control the exothermic reaction, water may also be added to function as a cosolvent.

The final aqueous solution of polymer salt is preferably in the range from about pH 5 to about pH 8, and more preferably in the range of pH 6-7, with a total solids content of from about 2 to about 60 percent by weight and preferably from about 5 to about 50 percent by weight of polymer in water.

The copolymers formed may have a weight average molecular weight in the range from about 2000 to about 50,000, and preferably from about 3000 to about 20,000 as determined by gel permeation chromatography. This determination is conventionally made according to ASTM method D-3536-76 (see ASTM Standards, Part 35, 1980), by dissolving the esterified copolymer (as in *J. Polym. Sci., Polym. Chem. Ed.*, 1976, Vol 14, pg 14) in tetrahydrofuran and comparing with a solution in THF of polystyrene of known molecular weight. The acid numbers of the copolymers formed, as determined by a conventional titration with KOH, may range from about 235 to about 585, corresponding to a weight fraction of from 30% to about 75% by wt of monomer units having COOH groups. The preferred polymers have more than 30% by wt of free carboxyl groups and an acid number in the range from about 400 to about 500.

In a typical one-pot, two-step process, a glass lined or stainless steel reactor is charged with acrylic acid (AA) in which about 1% by wt of the combined wt of AA and propylene oxide (PO) is the esterification catalyst dispersed or dissolved in the AA, along with a polymerization inhibitor. PO is added to the reactor gradually while it is heated in the range from about 50° C. to about 120° C., and more preferably from about 70° C. to about 100° C. under autogeneous pressure developed, and the reaction mass allowed to reflux. Higher temperatures than 100° C. result in unwanted byproducts attributable, inter alia, to the dimerization of AA. When, upon analysis, it is found that all the PO is reacted, it will be evident that no further esterification will take place. Thus, the ratio of the $HAA_m$ to the $HAA_p$ is determined for this reaction by the amount and choice of esterification catalyst, and the amount of alkylene oxide added in relation to the (M)AA.

Without cooling the reactor, additional (M)AA is added to give the desired monomer mix prior to formation of the terpolymer composition, along with a substantial quantity of alcohol solvent mixed with water. The polymerization catalyst is dissolved in alcohol and slowly dripped into the reactor while the heat of reaction is removed to maintain the reflux temperature of the solvent. When the polymerization is deemed to be complete, the reactor is cooled and the polymer solution recovered. The polymer is recovered by any conventional means. Though it will be evident this is the most convenient way of preparation, the practical problems dictate that it is not the best mode—the two-pot, two-step process is.

In the following illustrative examples the amounts of ingredients used are given in parts by weight unless otherwise specified.

EXAMPLE 1

"One-Pot, Two-Step Process"

Step One: Preparation of $HAA_m$, specifically hydroxymonopropylacrylate ("$HPA_m$") and $HAA_p$, specifically hydroxypolypropyleneoxyacrylate ("$HPA_p$") from acrylic acid ("AA") present in a molar excess:

A 15 gallon Pfaudler stainless steel jacketed pressurizable reactor fitted with internal cooling coils is equipped with a reflux condenser, a 7" Brumagin blade and paddle baffles. The reactor is charged with 58 lb of AA, 0.948 lb of pyridine and 43 grams methyl hydroquinone (MEHQ) and the mixture heated to and maintained at 80° C. under nitrogen while propylene oxide (PO) is slowly added to the reactor until 42.3 lb PO has been added over 2 hr. The AA is thus present in about a 10% molar excess over stoichiometric.

The pressure in the reactor builds up autogenously and the PO is refluxed. Esterification proceeds until all the PO is reacted at which point the pressure in the reactor drops to near atmospheric. Samples are withdrawn at intervals and analyzed by gas chromatography using 1,2-dimethoxyethane as an internal standard, from which data the amount of $HPA_p$ formed is computed. This confirms that the desired proportion of mono- to poly-ester has been formed. The analysis indicated that about 15% by wt of all the esters in the reaction mixture had plural propylene oxide units, which was expected based on earlier trial and error smaller scale reactions in which the amount of catalyst was varied. The reaction may be accelerated by heating to about 120° C. under higher pressure but this is inadvisable because of unwanted side reactions such as the dimerization of the AA.

Step Two: Preparation of the terpolymer having the foregoing structure (I):

To the foregoing reaction mass is added about 160 lb of isopropanol and enough additional acrylic acid to give the predetermined ratio of x:y:z in (I) which in this instance is about 55 lb AA. The reaction mass is allowed to reflux under a blanket of nitrogen or other inert gas, and a solution of about 2 lb Lupersol-11$^R$ t-butyl peroxypivalate in isopropyl alcohol is slowly dripped into the reaction mass, the temperature being controlled by the refluxing of the isopropanol. The reaction conditions are chosen by simple trial and error to give a desired mol wt. Because of the highly exothermic polymerization reaction and the difficulty of controlling the one-pot, two-step process satisfactorily, practical considerations dictate that the two-pot, two-step process is the more desirable one. After the reaction is complete, the copolymer is neutralized with 50% aqueous NaOH or anhydrous ammonia. The polymer obtained was found to contain no free AA, and essentially all of the polymer is found to be a random non-crosslinked terpolymer of the AA, $HPA_m$ and $HPA_p$ having the foregoing structure (I). The polymer is highly soluble in water to the extent of about 40 parts per 100 parts of water at pH 6.5.

EXAMPLE 2

"Two-Pot, Two-Step Process"

Step One: Esterifcation of the AA which is present in excess over stoichiometric, is done as described in Step One of Example 1 hereinabove.

Step Two: The reaction mass obtained in Step One is pumped slowly to a second stainless steel pressurizable jacketed reactor equipped with cooling coils, into which reactor about 180 lb of 2-propanol has been charged, the latter functioning as a solvent and heat transfer medium. The solvent is heated to reflux (about 80° C.) under a blanket of nitrogen, and simultaneously three streams, namely, AA (55 lb), the reaction mass obtained in step one, and a solution of 2 lb Lupersol 11 in isopropyl alcohol are gradually added to the reactor, the refluxing isopropyl alcohol being used to maintain the temperature. The terpolymer formed conforms to the same structure (I) as that of the terpolymer formed in example 1 hereinabove.

The terpolymer formed in each of the foregoing examples, and several others, is used to treat water which contains calcium ions and phosphate ions in a static test to gauge the effectiveness of the polymer for inhibiting the formation and deposition of calcium phosphate, as follows: A phosphate salt such as $Na_2HPO_4$ or other soluble phosphate is dissolved in water to provide a concentration of 13.3 ppm of $PO_4^{-3}$ ions, and a soluble calcium salt such as calcium chloride is also dissolved in the water to provide a $Ca^{++}$ ion conc. of 275 ppm. To this solution is added the terpolymer in an amount sufficient to provide a dosage of 10 ppm.

100 ml of this solution containing 10 ppm of terpolymer is poured into each of three clean 4 oz glass bottles and the pH is adjusted to 8.5 with NaOH. The bottles are placed in a water bath set at 50° C. and allowed to equilibrate for 5 hours. The temperature is chosen because it closely approximates cooling tower process water temperatures in summer in the northern U.S. The precipitation of calcium phosphate is so rapid that equilibration for more than 5 hours does not substantially change the results obtained with 5 hr.

The bottles are removed from the water bath and the contents filtered through a 0.2 micron millipore filter. The filtrate is allowed to cool to room temperature (20° C.) and then analyzed for $PO_4^{-3}$ using the ascorbic acid method as described in detail in "Standard Methods for the Examination of Water and Wastewater" 14th edition, prepared and published jointly by American Public Health Association et al. The instrument used for the colorimetric measurements was a Beckman 5270 Spectrophotometer. The results of the tests were as follows:

TABLE I

| Ex. No. | Polymer | Molar ratio of monomers | Mol. Wt. | % $Ca_3(PO_4)_2$ inhibition |
|---|---|---|---|---|
| 1 | [AA] | | 2100 | 34 |
| 2 | [AA] | | 5100 | 22 |
| 3 | [AA] | | 180000 | 4 |
| 4 | [AA/$HPA_m$] | 3:1 | 7000 | 72 |
| 5 | [AA/$HPA_m$/$HPA_p$] | 3:1:0.2 | 7000 | 79 |
| 6 | same | 3:1:0.1 | 7000 | 82 |
| 7 | same | 3:1:0.05 | 7000 | 81 |

It will be evident that there is a better than 10% improvement in inhibition when there is $HAA_p$ in the polymer, and this improvement is significant at this level of inhibition.

It will also be evident that the value of n in the repeating unit of individual molecules of terpolymer will not be identical, and it is found that the majority of terpolymer molecules have n in the range from 2 to about 4. With respect to the polymerization reaction, it will be appreciated that it is essential to maintain the temperature of the reaction mass during polymerization in a suitable temperature range, preferably from about 50° C. to about 130° C., and to do this, the polymerization reactor must be cooled. This is most conveniently done by reflux cooling with the appropriate heat exchange means. However, particularly in the one pot, two-step process, the highly exothermic nature of the reaction dictates that in addition to reflux cooling, both internal and external heat exchange means be used to maintain the preferred temperature range.

I claim:

1. A method for inhibiting the deposition of scale due particularly to calcium phosphate and magnesium phosphate formed in a system for treating process water, comprising, adding to said process water from 2 parts per million (ppm) to about 200 ppm of a water-soluble essentially non-crosslinked random copolymer consisting essentially of a terpolymer of acrylic acid or methacrylic acid and esters of 2-hydroxyalkyl(meth)acrylate, the terpolymer having the structural formula

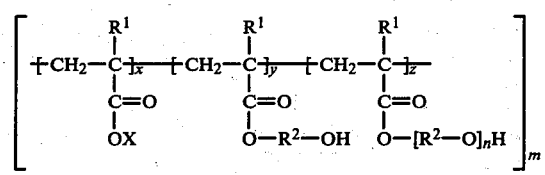

wherein,

X represents H, or NH$_4$, or an alkali metal selected from the group consisting of sodium and potassium;

R$^1$ represents H, or methyl;

R$^2$ represents lower alkyl having from 2 to about 4 carbon atoms;

n is an integer in the range from 2 to about 6;

m is an integer in the range from about 3 to about 180; and, for each y (that is, y=1) x is an integer in the range from about 2 to 5, and z is an integer in the range from 0.02 to about 0.3; and x, y and z are present in relative heterogeneous order.

2. The method of claim 1 wherein said process water is used in a steam generating system.

3. The method of claim 1 wherein said process water is used in a recirculating cooling water system.

4. The method of claim 1 wherein said process water is used in a gas scrubbing system.

5. The method of claim 1 wherein X represents sodium, R$^1$ represents hydrogen and R$^2$ represents propyl.

6. A composition for treating process water in a recirculating water system, said composition comprising an effective amount for the purpose, of a water-soluble essentially non-crosslinked random copolymer consisting essentially of a terpolymer of acrylic acid or methacrylic acid and esters of 2-hydroxyalkyl-(meth)acrylate, the terpolymer having the structural formula

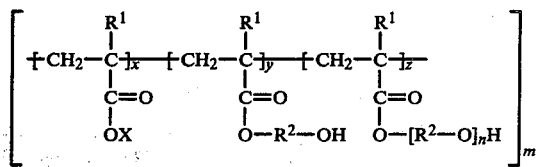

wherein,

X represents H, or NH$_4$, or an alkali metal selected from the group consisting of sodium and potassium;

R$^1$ represents H, or methyl;

R$^2$ represents lower alkyl having from 2 to about 4 carbon atoms;

n is an integer in the range from 2 to about 6;

m is an integer in the range from about 3 to about 180; and, for each y (that is, y=1) x is an integer in the range from about 2 to 5, and z is an integer in the range from 0.02 to about 0.3; and x, y and z are present in relative heterogeneous order.

7. The composition of claim 6 wherein R$^1$ represents hydrogen, and R$^2$ represents propyl.

8. A two-step process for preparing an essentially non-crosslinked random copolymer consisting essentially of a terpolymer of (i) acrylic acid or methacrylic acid ("(meth)acrylic acid"), (ii) a lower alkyl monoalkoxylated (meth)acrylate ("HAA$_m$"), and (iii) a lower alkyl polyalkoxylated (meth)acrylate ("HAA$_p$") containing plural reacted alkylene oxide groups, the terpolymer having the structural formula

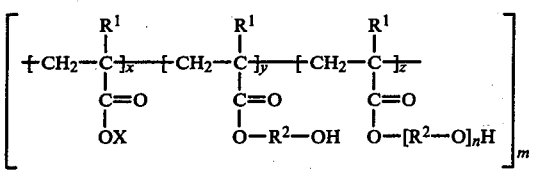

wherein,

X represents H, or NH$_4$, or an alkali metal selected from the group consisting of sodium and potassium;

R$^1$ represents H, or methyl;

R$^2$ represents lower alkyl having from 2 to about 4 carbon atoms;

n is an integer in the range from 2 to about 6;

m is an integer in the range from about 3 to about 180; and, for each y (that is, y=1) x is an integer in the range from about 2 to 5, and z is an integer in the range from 0.02 to about 0.3; and x, y and z are present in relative heterogeneous order, said process comprising, (a) reacting a mixture comprising (meth)acrylic acid and a lower alkylene oxide having from 2 to about 6 carbon atoms, in the presence of a predetermined amount of an esterification catalyst selected from the group consisting of pyridine, tetramethylammonium chloride, trimethylbenzyl ammonium chloride, and 2,6-lutidine at a temperature in the range from about 60° C. to about 120° C., for a period of time sufficient to form HAA$_m$ and HAA$_p$ in the ratio from about 1:0.02 to about 1:0.3;

(b) without separating the esterification catalyst from the reaction mass, adding an effective amount of polymerization initiator, and forming the copolymer at about the reflux temperature of the solvent, and, (c) recovering the copolymer.

9. The process of claim 8 wherein in step (a) there is present a slight molar excess, in the range from about 5 to about 25%, over that stoichiometrically required to form said $HAA_m$.

10. The process of claim 9 wherein the reaction mass obtained in step (a) containing $HAA_m$ and $HAA_p$ is added slowly to another reactor containing a mutual solvent for conducting a polymerization reaction at about the reflux temperature, into which second reactor (meth)acrylic acid and a solution of polymerization initiator are also gradually added while the contents of the second reactor are maintained in the temperature range from about 50° C. to about 130° C.

11. The process of claim 9 wherein, after step (a), a solution of (meth)acrylic acid in a lower alkanol having from 1 to about 6 carbon atoms is added to the reactor, followed by a solution of polymerization initiator while maintaining the contents of the reactor during polymerization in the temperature range from about 50° C. to about 130° C.

12. The process of claim 10 wherein said mutual solvent is a lower alkanol having from 1 to about 6 carbon atoms and the contents of the reactor are maintained in said temperature range by reflux cooling.

13. The process of claim 11 wherein said lower alkanol is 2-propanol and the contents of the reactor are maintained in said temperature range by a combination of reflux cooling and internal and external heat exchange means.

* * * * *